Aug. 21, 1956  W. C. EDMUNDSON  2,760,094
DYNAMO ELECTRIC MACHINE
Filed Jan. 3, 1955  2 Sheets-Sheet 1

INVENTOR.
William C. Edmundson
BY John T. Marvin
His Attorney

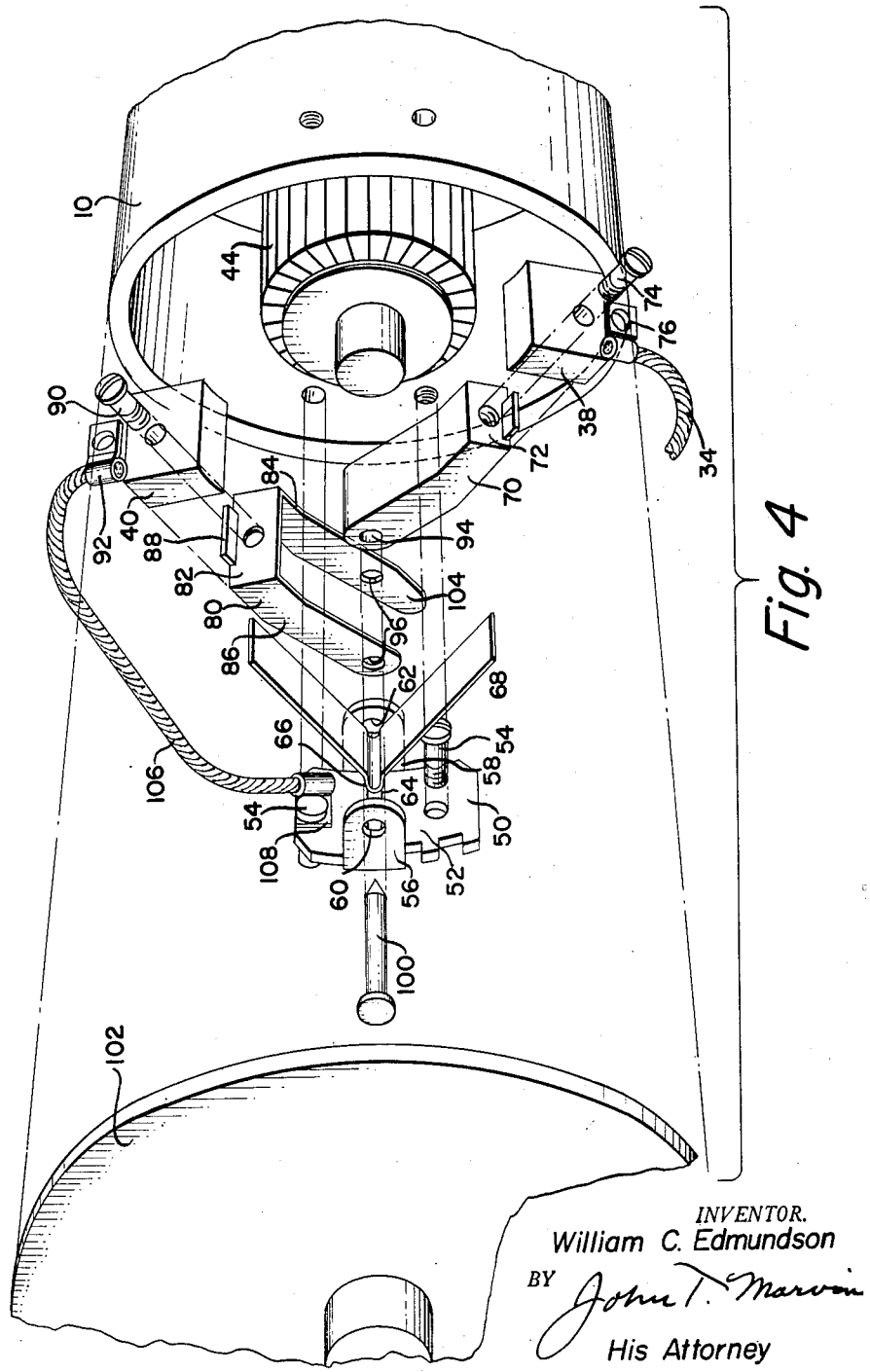

United States Patent Office 2,760,094
Patented Aug. 21, 1956

2,760,094

DYNAMOELECTRIC MACHINE

William C. Edmundson, Anderson, Ind., assignor to General Motors Corporation, Detroit, Mich., a corporation of Delaware Application January 3, 1955, Serial No. 479,419

7 Claims. (Cl. 310—239)

This invention relates to dynamoelectric machines and is more particularly concerned with an improved brush rigging for use in a dynamoelectric machine of the commutator type.

In the conventional dynamoelectric machines, wherein a cylindrical commutator rotates within a group of brushes, it has been the practice to mount the brush carrying structure on the end plate that carries one of the bearings which support the armature. When this construction is utilized assembly difficulties are encountered as it is not only difficult to align the brushes correctly with the commutator but it is also difficult to hold the brushes in a retracted position so that the commutator may pass therebetween during assembly. Further, after the parts are assembled it was almost impossible to inspect and adjust the brush and commutator relation without providing openings in the frame structure.

A successful attempt to solve the above difficulties is set forth in U. S. patent application, 377,434, filed August 31, 1953, and assigned by the inventors to the assignee of the present invention. The present invention relates to a modification and an improvement in certain parts of the structure set forth in patent application, supra, and provides a brush rigging that is characterized by its simplicity of parts, its ease of assembly, and its reliability of operation when installed in a dynamoelectric machine.

It is an object therefore of the present invention to provide a brush rigging for a dynamoelectric machine which rigging will permit the brushes to orient themselves with restrained freedom relative to the commutator of the machine.

It is a further object of the present invention to incorporate a brush rigging into the frame structure of a dynamoelectric machine so that the pin which permits the brushes to have a degree of freedom of movement may be held against displacement by an end cover for the machine.

Another object of the present invention is to provide a dynamoelectric machine with a brush rigging that is carried on the frame of the machine by a U-shaped bracket that has the arms formed with aligned openings which are formed to journal loosely a pivot pin which extends through aligned openings in a pair of brush holders so that the pin will permit the brushes to have limited freedom of movement relative to the commutator and to provide a cover which is secured to the frame and holds the pin against displacement from the holes in the bracket.

A still further object of the present invention is to provide a brush rigging for a dynamoelectric machine with a sheet metal bracket that has a curved portion adapted to be secured on a curved surface of the frame and a pair of spaced parallel arms with aligned openings therein that are adapted to loosely receive a pivot pin which extends through alined bores in the ends of a pair of oppositely oriented brush holders which have their other ends constantly urged toward the commutator by the arms of a leaf spring that is held in its proper position by a notch that is formed in the bracket between the spaced parallel arms.

Further objects and advantages of the present invention will be apparent from the following description, reference being had to the accompanying drawings wherein a preferred embodiment of the present invention is clearly shown.

In the drawings:

Figure 4 is an exploded view showing the parts according to the present invention in perspective.

Figure 1:
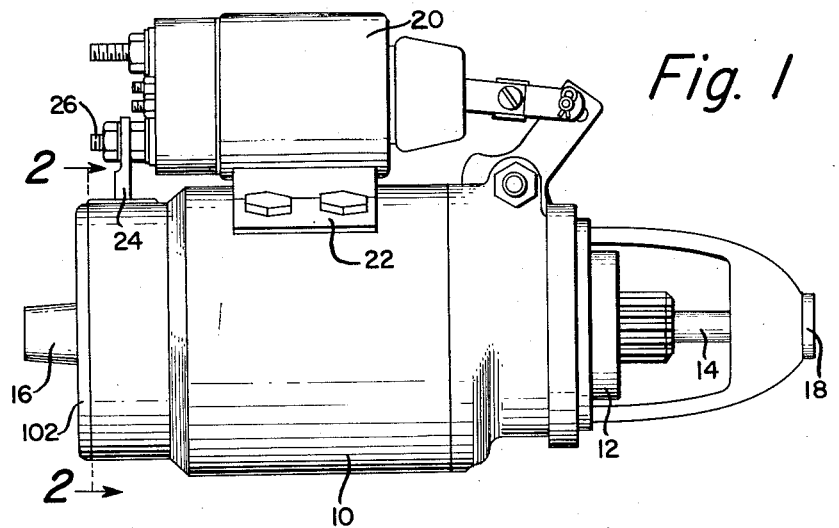
Figure 1 is a side view of a dynamoelectric machine wherein the brush rigging according to the present invention may be incorporated.

In the drawings, the numeral 10 designates a field frame or casing of a dynamoelectric machine, for example, a starting motor for an automobile engine, which includes field windings and an armature 12 carried by a shaft 14 rotatable on bearings 16 and 18. The operation of the machine is under control of a solenoid 20 that is mounted on frame 10 by a bracket 22. The solenoid is electrically connected with the various parts in the interior of frame 10 by means of a connector 24 that is joined to a terminal 26 on solenoid 20. Connector 24 which extends to the interior of frame 10, Figure 2, makes an electrical connection with the clip of electric lead 28 which is electrically connected with a shunt field winding, not shown, and with leads 32 and 34 which are connected with a series field and brushes 36, 38, 40 and 42 in the conventional manner. The brushes 36, 38, 40 and 42 each ride on a commutator 44 which is carried on shaft 14.

Figure 2:
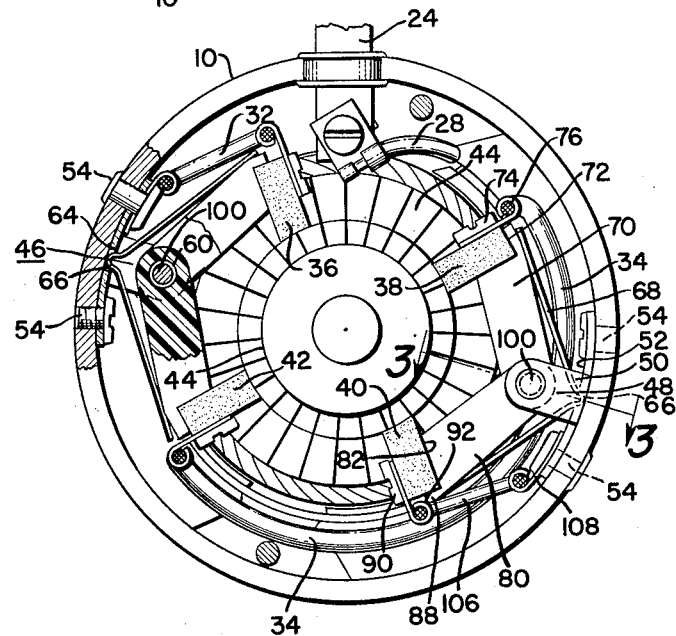
Figure 2 is a view, partly in section, along line 2—2 of Figure 1 showing a brush rigging according to the present invention.
Figure 3:
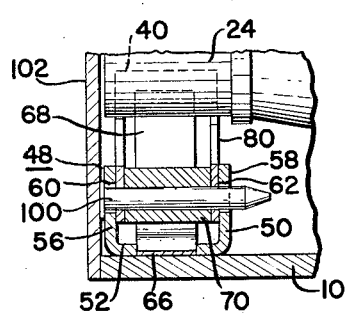
Figure 3 is a sectional view along line 3—3 in Figure 2.

As shown in Figure 2, the brushes 36 to 42 are grouped in two pairs of similar brush assemblies herein designated as 46 and 48. The detailed description of one brush assembly should be sufficient to include the specific details of the other. The brush rigging 48 is most clearly shown in Figure 4 and includes a U-shaped hanger or bracket 50 that has an arcuate central portion 52 secured to the inner surface of the starter casing 10 by means of rivets 54. The bracket 50 also has a pair of arms 56 and 58 which are parallelly disposed to each other and spaced on the central portion 52 and radially extend within frame 10 toward shaft 14. Each of the arms 56 and 58 have an aperture therein. Aperture 60 as formed in arm 56 is larger in diameter than aperture 62 in arm 58. Each of the apertures 60 and 62 is aligned on an axis that is parallel to the axis of shaft 14. The central portion 52 of bracket 50 has a notch 64 formed therein which extends between arms 56 and 58 along an axis parallel to the axis of apertures 60 and 62. The notch 64 is adapted to receive and hold in position the apex 66 of a V-shaped leaf spring 68.

The brush holder 70 is of non-conducting material and has a free end notched at 72 to receive one end of brush 38 which is held in place by a mounting screw 74 passing through a terminal clip 76 and threaded into the notched end 72 of the arm 70. The brush 38 is electrically connected through clip 76 and wire 34 with brush 42 of the other assembly 46. The brush holder 80 is formed from sheet metal and has an inclined end portion 82, from the opposite ends of which extend arms 84 and 86 which are spaced in parallel to embrace the non-conducting brush holder 70 and be received between the arms 56 and 58 of bracket 50. Bent outwardly from the inclined end 82 is a lug or flange 88 which is positioned to abut one end of brush 40 that is secured to the holder 80 by a screw 90 which extends through a terminal clip 92 and is threaded into an opening in the inclined portion 82.

The brush holders 70 and 80 have openings therein which include bore 94 in holder 70 and apertures 96 in holder 80. The openings are located on the other ends from the brush carrying portions of the holders 70 and 80 and are sized to be aligned with apertures 60 and 62 of arms 56 and 58 when the brushes 38 and 40 are riding upon commutator 24, and the holders 70 and 80 are held in position relative to bracket 50 by a pin 100 which is sized to fit in bore 94 and apertures 96. The size of pin 100 is such that the pin 100 will have a free fit in aperture 62 and a sloppy fit in aperture 60. The enlarged aperture 60 in arm 56 permits a restrained freedom of movement between the pin 100 and bracket 50 and thus allows the brushes 38 and 40 to orient themselves relative to the commutator 24 when the various parts of the brush holder assembly 48 are in position on frame 10.

After the bracket 50 is secured in frame 10 by means of rivets 54 and the brushes 38 and 40 and clips 76 and 92 are secured to holders 70 and 80, and the leaf spring 68 is positioned in notch 64, the brushholders are positioned between arms 56 and 58 so that pin 100 may pass through the apertures or openings 60, 96, 94, and 62 to provide a pivotal connection for the holders 70 and 80. The pin 100 is maintained in this position by the end cover 102 when the cover 102 is secured, by means not shown, to frame 10.

When the brushholders 70 and 80 are assembled on the pivot pin 100, the brushes 38 and 40 are urged to engage the commutator 24 by means of the V-shaped leaf spring 68 which is held in position at its apex portion 66 by notch 64 in bracket 50. An extension 104 which is formed on the arm 84 of brushholder 80 is sized so that it will engage the inner surface of frame 10 in the event the commutator 24 is not positioned between the brushes. This extension 104 will limit the distance which the arms of leaf spring 68 may urge the brushholders 70 and 80 toward each other so that the brushholders will not engage the commutator when the brushes are worn out. The grounded brush 36, as mounted on the metal brushholder 80, is connected by terminal clip 92 and wire 106 to a grounding clip 108 that is held by rivet 56, which also serves to attach bracket 50 to frame 10.

The above arrangement of parts will provide two brushholder assemblies 46 and 48 which are easy to assemble prior to the securing of cover 102 to frame 10. Thus the cover may be removed at anytime for servicing the components of the brush rigging and brushes without removal of the parts from the dynamoelectric machine.

While the embodiments of the present invention as herein disclosed constitute preferred forms, it is to be understood that other forms might be adopted.

What is claimed is as follows:

1. A brush rigging for holding a pair of brushes against the commutator of a dynamoelectric machine having a tubular frame, comprising; a U-shaped bracket adapted to be attached by its center portion to said frame and having aligned apertures in the extending arms of said U-shaped bracket, a pair of brush holders extending in opposite directions from said bracket, each having an opening therein in alignment with the apertures in the arms of said U-shaped bracket, a V-shaped spring positioned by said bracket and having the arm portions thereof adapted to urge the brushholders toward said commutator, and a pivot pin having a diameter substantially smaller than at least one of the apertures in said arms and adapted to be inserted through the openings in said holders and the apertures in said arms for providing a pivotal connection between the bracket and said holders.

2. A brush rigging for holding a pair of brushes against the commutator of a dynamoelectric machine having a tubular frame and an end cover, comprising in combination; a U-shaped bracket having a pair of spaced arms connected by a center portion that is adapted to be attached to said frame, each of said arms having an aperture therein aligned with the aperture in the other arm, a pair of brushholders disposed in opposite directions from said bracket and having openings on one end in alignment with the apertures in said arms, a V-shaped spring adapted to be positioned by said bracket for urging said brushholders toward said commutator, and a pivot pin having a headed portion and a shank portion, said shank portion being of smaller diameter than said apertures and adapted to extend through the openings in said holders and the apertures in said arms for providing a pivotal connection between said holders and bracket, said pin being adapted to be held in position by its headed portion in the apertures of said bracket when the cover is secured on said frame.

3. A brush rigging for holding a pair of brushes against the commutator of a dynamoelectric machine that has a tubular frame, comprising in combination; a bracket having a pair of arms extending in spaced parallel relation from an intermediate portion that is adapted to be attached to said frame, each of said arms having an aperture therein aligned with an aperture in the other arm, a pair of brushholders extending substantially in opposite directions from said bracket, each of said holders having an opening therein in alignment with said apertures, and a pivot pin having a shank of a diameter substantially less than the diameter of at least one of said apertures and adapted to extend through the openings in said holders and the apertures in said arms for providing a pivotal connection having a rocking fit between the holders and said bracket.

4. A brush rigging for holding a pair of brushes against the commutator of a dynamoelectric machine that has a tubular frame, comprising in combination; a bracket having a pair of arms extending in spaced parallel relation from an intermediate portion that is adapted to be connected to said frame, each of said arms having an aperture therein aligned with an aperture in the other arm, a pair of brushholders extending substantially in opposite directions from said bracket, each of said holders having an opening therein in alignment with said apertures, a resilient means adapted to be positioned by said bracket for urging said brushholders toward said commutator and a pivot pin having a shank of a diameter less than the diameter of at least one of said apertures and adapted to extend through the openings in said holders and the apertures in said arms for providing a pivotal connection having a rocking fit between the holders and said bracket.

5. A brush rigging for mounting a pair of brushes in cooperating relation with a commutator of a dynamoelectric machine that has a tubular outer frame, comprising in combination; a bracket having an arcuate portion adapted to be mounted on an inner surface of said frame and having parallel arms on opposite sides from said arcuate portion extending radially toward said commutator, each of said arms having an aperture therein spaced relative to said arcuate portion and aligned with the aperture in the other arm, said arcuate portion having an extending notch therein disposed between said arms, a pair of brushholders extending in substantially opposite directions from said bracket and having an opening in one end in alignment with said apertures and carrying a brush on the other end for engagement with said commutator, a V-shaped leaf spring between said bracket and holders, said spring having an apex portion thereof in the notch in said bracket and the arm portions thereof in engagement with said brushes for urging said holders toward said commutator, and a pivot pin having a shank of a diameter less than the diameter of both of said apertures and adapted to extend through the openings in said holders and the apertures in said arms for providing a pivotal connection having a rocking fit between the holders and said bracket.

6. A brush rigging for mounting a pair of brushes in cooperating relation with a commutator of a dynamoelectric machine that has a tubular outer frame, comprising in combination; a bracket having an arcuate portion adapted to be mounted on an inner surface of said frame and having parallel arms extending radially from the inner surface of said frame and disposed on opposite sides of the arcuate portion, said arms each having an aperture therein spaced relative to said arcuate portion and aligned with the aperture in the other arm, a pair of brushholders extending in substantially opposite directions from said bracket and each holder having an opening in one end in alignment with said apertures and carrying a brush on the other end for engagement with said commutator, a V-shaped leaf spring between said bracket and holders, said spring being held by said bracket and having arm portions thereof in engagement with said brushes for urging said holders toward said commutator, and a pivot pin having a shank of a diameter less than the diameter of both of said apertures and adapted to extend through the openings in said holders and apertures in said arms for providing a pivotal connection having a rocking fit between the holders and said bracket.

7. A brush rigging for mounting a pair of brushes in cooperating relation with a commutator of a dynamoelectric machine that has a tubular outer frame and an end cover for said frame, comprising in combination; a bracket having an arcuate portion adapted to be mounted on an inner surface of said frame and having parallel arms extending radially from the inner surface of said frame and disposed on opposite sides of the arcuate portion, said arms each having an aperture therein spaced relative to said arcuate portion and aligned with the aperture in the other arm, a pair of brushholders extending in substantially opposite directions from said bracket and each holder having an opening in one end in alignment with said apertures and carrying a brush on the other end for engagement with said commutator, a V-shaped leaf spring between said bracket and holders, said spring being held by said bracket and having arm portions thereof in engagement with said brushes for urging said holders toward said commutator, and a pivot pin having a headed portion and a shank of a diameter less than the diameter of said apertures and adapted to extend through the openings in said holders and the apertures in said arms for providing a pivotal connection having a rocking fit between the holders and said bracket, said pin being adapted to be held in position by its headed portion in the apertures of said bracket when the cover is secured on said frame.

References Cited in the file of this patent
UNITED STATES PATENTS

| | | |
|---|---|---|
| 1,192,268 | Borchard | July 25, 1916 |
| 1,698,799 | Leland | Jan. 15, 1929 |